June 11, 1940. H. V. KOJOLA ET AL 2,204,184
PROCESS FOR PRODUCING ACETYLENE AND LIME HYDRATE
Filed March 27, 1936 2 Sheets-Sheet 1
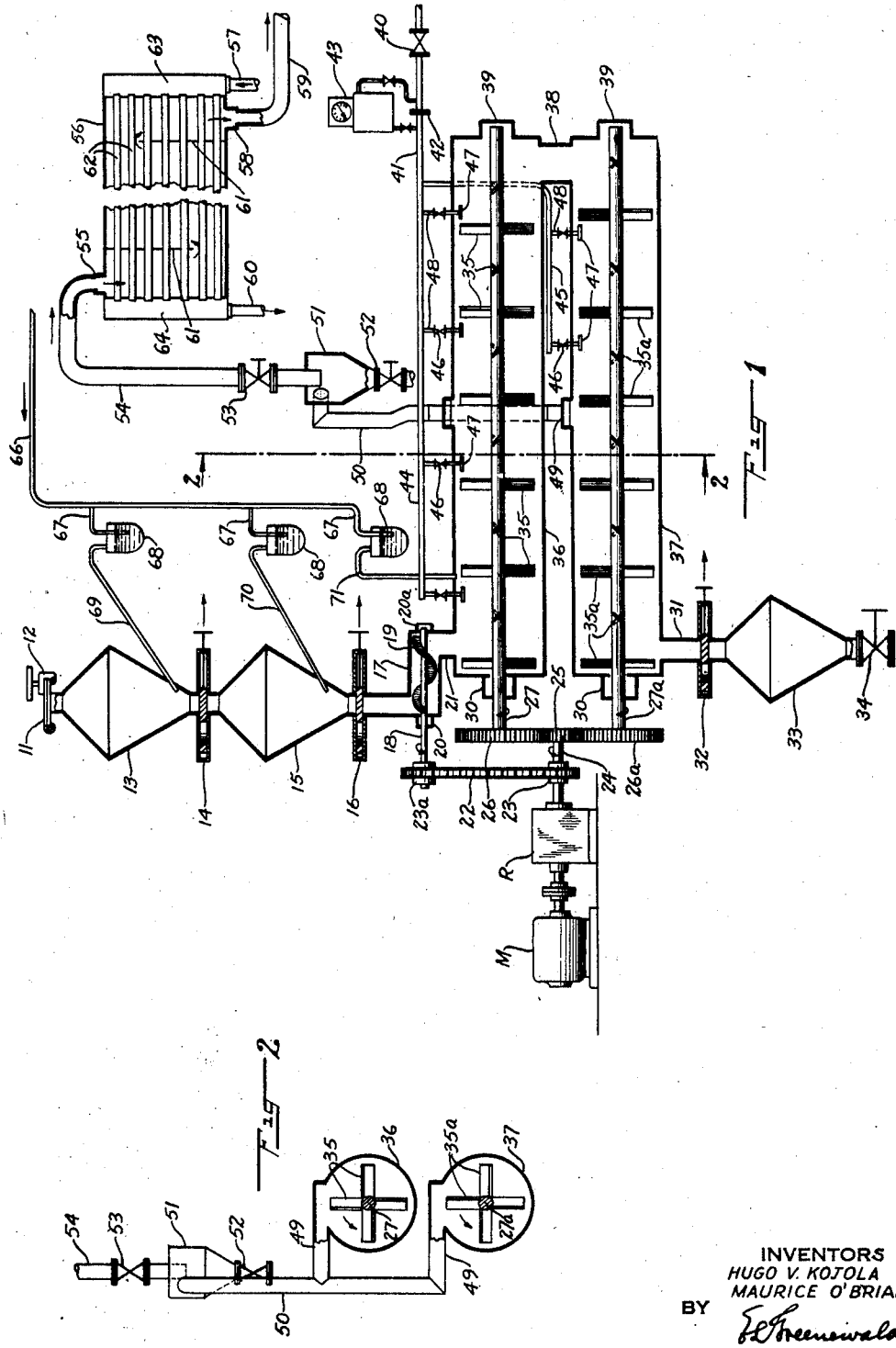
INVENTORS
HUGO V. KOJOLA
MAURICE O'BRIAN
BY
ATTORNEY June 11, 1940.  H. V. KOJOLA ET AL  2,204,184
PROCESS FOR PRODUCING ACETYLENE AND LIME HYDRATE
Filed March 27, 1936  2 Sheets-Sheet 2
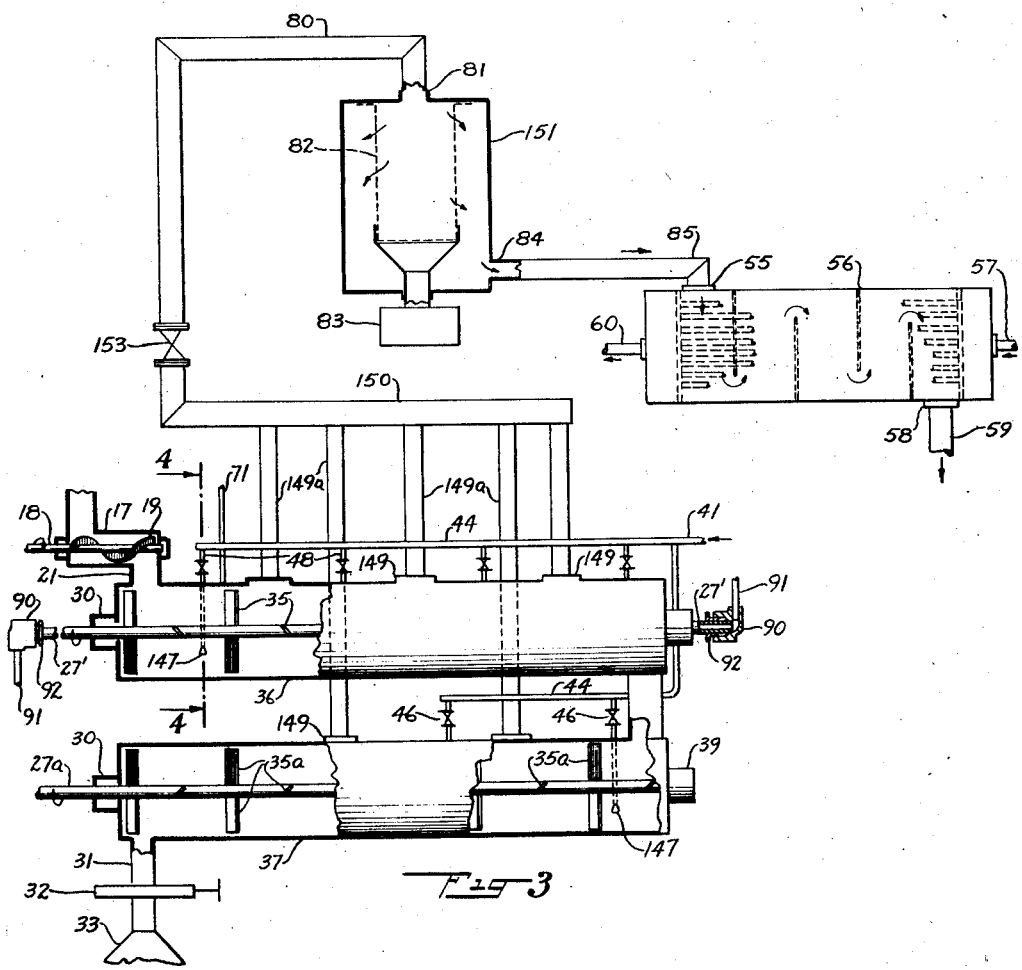
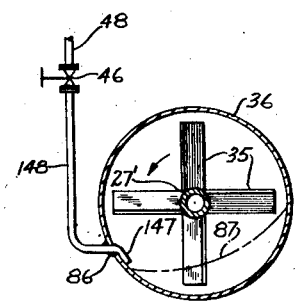
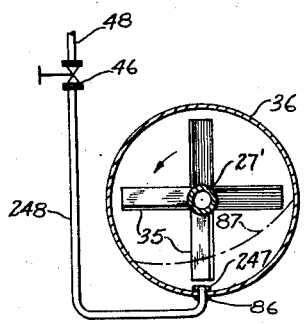
INVENTORS
HUGO V. KOJOLA
MAURICE O'BRIAN
BY
ATTORNEY Patented June 11, 1940

2,204,184

UNITED STATES PATENT OFFICE 2,204,184

PROCESS FOR PRODUCING ACETYLENE AND LIME HYDRATE

Hugo V. Kojola and Maurice O'Brian, Indianapolis, Ind., assignors to The Prest-O-Lite Company, Inc., a corporation of New York Application March 27, 1936, Serial No. 71,210

5 Claims. (Cl. 48—216)

This invention relates to the generation of a gas wherein the gas is produced by the reaction of a solid and a liquid. More specifically, this invention relates to the generation of acetylene by the reaction of the calcium carbide and water, and particularly to the simultaneous production of acetylene and a substantially dry residue of calcium hydrate. This latter process is known as "dry generation."

The reaction which takes place when calcium carbide and water are brought together is represented by the following:

$$CaC_2 + 2H_2O \rightarrow C_2H_2 + Ca(OH)_2$$

Prior to the advent of the dry generation of acetylene it was customary to generate acetylene by dropping granular calcium carbide into a body of water contained in a generating chamber. Seven to ten times the amount of water necessary to complete the reaction was used so as to utilize the heat carrying capacity of the excess of water to absorb the heat of reaction, since the reaction is highly exothermic. The principal disadvantage incurred in this method of generation was the production of the calcium hydrate as a lime sludge. This sludge was cumbersome to handle and difficult to dispose of since the calcium hydrate could be recovered in a dry and useable form only at considerable expense.

In an attempt to obviate this difficulty the process of "dry generation" was developed. In this process the calcium carbide is contacted with an amount of water limited to that necessary to completely react the carbide, plus an additional amount which is evaporated so as to utilize the latent heat of evaporation of the excess water to absorb the heat of reaction. While this process should produce a substantially dry residue, the acetylene evolved is saturated with water vapor by the evaporation of the excess water supplied for the purpose of limiting the maximum temperature reached to a temperature of 100° C. or lower. By limiting the temperature to a value below 100° C., there is a tendency for the moisture in the saturated acetylene to condense upon the dry residue when cooled, and thus defeat the very purpose of the dry generation.

Since the water used in the generation of acetylene almost invariably carries impurities in the form of dissolved gases such as air, any excess water used in the generation of acetylene will increase the amount of those impurities. The presence of these impurities is especially disadvantageous in acetylene to be utilized in chemical systems and in acetylene to be compressed and forced into cylinders containing acetone for the purpose of dissolving the acetylene. In chemical systems the presence of these impurities and their accumulation will necessitate periodic blow-offs, which obviously interrupt the cycle and cause the loss of gas. In acetylene used for compression into cylinders containing acetone and a porous filler, the presence of impurities will cause the pressure to build up abnormally because such impurities are much less soluble in acetone than acetylene. A decrease in the amount of impurities will increase the amount of acetylene that can be dissolved in a cylinder without exceeding a desired pressure limit.

Broadly, the main object of this invention is to provide an improved method of producing a gas and a substantially dry residue by the reaction of a solid and a liquid; and, more specifically, to provide a method of producing acetylene and substantially dry calcium hydrate by the reaction of calcium carbide and water, such method being adapted to produce the acetylene and the dry calcium hydrate at temperatures substantially in excess of 100° C., thereby rendering the gas substantially free from impurities. Other objects of this invention are to provide an improved method of producing a gas and a substantially dry residue by the reaction of a solid and a liquid, which will be continuous, simple and efficient; to provide such methods wherein the temperature in the various stages of the process may be easily controlled.

These and other novel features of this invention will be apparent from the following description and accompanying drawings in which:

Fig. 1 is a diagrammatic elevational view, mainly in section, and showing an apparatus for producing acetylene in accordance with the principles of the present invention;

Fig. 2 is a fragmentary vertical sectional view of the apparatus, the view being taken substantially along the line 2—2 of Fig. 1;

Fig. 3 is a diagrammatic view, partly in section, of a modified form of gas generating apparatus;

Fig. 4 is a fragmentary vertical sectional view of the apparatus shown in Fig. 3, the view being taken substantially along the line 4—4 of Fig. 3; and Fig. 5 is a view similar to Fig. 4 and illustrating a modified position for introducing the water into the generating chamber.

It has been found that with maximum temperatures occurring up to 400° C. acetylene, substantially free from impurities, can be safely generated in large quantities by the reaction of calcium carbide with a limited amount of water, if the carbide and hydrate produced are kept in constant agitation and the proper amount of water is added at a plurality of points along a predetermined path in a generating chamber. At temperatures above 400° C., the decomposition of acetylene occurs. In addition, it has been found advantageous to remove the generated acetylene as promptly as possible so that the time of contact of the acetylene with the reacting portions of the carbide will be limited. By controlling the quantity of water supplied to only a slight excess over that theoretically required to complete the reaction (the exact amount depending upon the rate and temperature of generation in relation to the various features of the apparatus employed), a residue of substantially dry hydrated lime and acetylene gas having a considerably decreased moisture content may be continuously produced.

An apparatus for carrying out the reaction according to the invention comprises fixed horizontal tubular chambers arranged in single or multiple units according to the working space available and provided with agitator paddle conveyor means disposed longitudinally within each chamber, the construction of said conveyor means being such that the generated gas may have a substantially unimpeded flow out of the chamber. Carbide from one or more feed hoppers is supplied to the first reaction chamber by a suitable means and the water is introduced at desired points in the reaction chamber along the path of the carbide. A sufficient length of reaction chamber and mixing conveyor is provided to insure complete conversion of the carbide into a residue of substantially dry hydrated lime which may be discharged into a lime hopper. The gas after generation is preferably passed through dust separating means and a cooler.

Briefly, the apparatus shown in Fig. 1 consists of a vertical carbide supply hopper 13 disposed above a second vertical hopper 15 which is adapted to discharge carbide into an upper horizontal reaction chamber 36 at predetermined rates by means of a feed screw 19. A plurality of spaced rotatable paddles 35 mounted on an axially disposed shaft 27 are arranged to sweep the entire inner surface of the chamber, and adapted to continuously mix and convey the carbide to a vertically disposed passage 38 between the upper reaction chamber 36 and a lower horizontal reaction chamber 37. In the lower reaction chamber spaced paddles 35a are provided on a shaft 27a as in the upper reaction chamber. Water may be introduced into the reaction chambers by spray nozzles 47 and the dry hydrate discharged into a lime hopper 33 through a vertical conduit 31 connected to the lower reaction chamber 37 at its discharge end. The generated gas is adapted to pass through pipe 50 into a separator 51 and thence into a cooler 56.

In detail it will be seen that the upper carbide supply hopper 13 is provided with an air-tight door 11 which is adapted to be closed by clamp 12, and a valve 14 to control communication with the lower hopper 15. The lower hopper 15 is connected to the feed conduit 17 by a passage controlled by valve 16. In the feed conduit 17 there is provided a feed screw 19 carried by a shaft 18 which extends through the hopper end of the feed conduit and is journaled in bearings 20 and 20a positioned in the ends of the feed conduit. A suitable air-tight packing, which is not shown, is preferably provided at bearing 20. The feed conduit 17 communicates with the upper reaction chamber 36 through passage 21. Shafts 27 and 27a carrying blades or paddles 35 and 35a are centrally located in the upper and lower reaction chambers and are journaled in bearings 30 and 39 provided in the ends of said chambers. An air-tight packing, also not shown, which may be similar to the one provided at bearing 20, is preferably provided at each of the bearings 30. The drive for the shafts 18, 27, and 27a comprises a motor M driving reduction-gearing R connected to a shaft 24 on which is mounted a sprocket wheel 23 and a pinion 25. The sprocket 23 drives the shaft 18 through a chain 22 carried upon it and upon a sprocket 23a on the shaft 18. The pinion 25 drives shafts 27 and 27a through gears 26 and 26a which intermesh therewith.

When the paddles 35 are turned by the shaft 27, they are adapted to continuously agitate, mix and convey the carbide through the length of the upper reaction chamber 36 to the passage 38 which communicates with the lower reaction chamber. The paddles 35a are likewise adapted to agitate and convey the reacting carbide and calcium hydrate through the length of the lower reaction chamber 37 to the discharge conduit 31 which is connected to the discharge hopper 33 and is controlled by a valve 32. The discharge hopper 33 is adapted to receive and temporarily hold the dry lime hydrate, and a valve 34 is provided at the bottom of the discharge hopper to permit removal of the dry hydrate, from time to time as desired.

The water to contact the carbide is supplied through a main supply line 41 in which is placed a control valve 40, a metering orifice 42 and a flow meter 43 actuated by the pressure drop of the fluid passing through the orifice. The upper and lower reaction chambers are served by supply pipes 44 and 45 respectively, which lead from the main line 41. The water is introduced into the reaction chambers from the supply pipes 44 and 45 by means of a plurality of branches 48 which enter the reaction chambers and are adapted to discharge the water therein through a plurality of nozzles 47. The supply of water to each nozzle is controlled by a valve 46 placed in its respective branch 48.

The generated gas or acetylene passes into the centrally located collecting conduits 49 shown more clearly in Fig. 2, and into the main header 50. Thence it passes into a dust separating device or chamber 51 provided at its lower end with a valve 52 and adapted to remove and hold small particles of the dry hydrate which may be carried by the acetylene from the reaction chambers. From the separating chamber 51 the gas passes through a conduit 54, controlled by valve 53, and into a cooler 56. The cooler 56 is preferably a horizontal tubular gas-to-liquid heat exchanger, in which the cooling water introduced at 57 flows generally countercurrent to the gas introduced at 55. The gas after being cooled passes from the cooler at an outlet connection 58 and is led by a conduit 59 to a gas holder or other suitable storage apparatus (not shown). The cooling water, upon its discharge from the cooler at a water outlet 60, may be discharged as waste or by-passed into the water supply line 41.

A pipe 66 leading from the gas holder is connected to the upper and lower carbide hoppers and the upper generating chamber through branches 67, vacuum relief seals 68, and pipes 69, 70, and 71 respectively. The seals 68 are filled to a point above the lower end of the depending pipe 67 with water or other suitable liquid. If a vacuum occurs in either of the hoppers or in the generating chambers upon shutdown of the apparatus, the acetylene will flow back from the gas holder through the pipe 66 and seals 68.

The operation of the apparatus of Figs. 1 and 2 is as follows: At the start, the valve 14 between the upper and lower carbide hoppers is opened, the clamp 12 is unfastened and the air-tight lid 11 of the supply hopper 13 is swung to an open position. Carbide is introduced into the supply hopper and passes into the lower hopper 15 through the open valve 14. When both hoppers are full, the air-tight lid 11 is closed and clamp 12 tightened down, and the carbide is ready to be fed into the generator. During the operation of the apparatus when the supply hopper needs to be refilled, the valve 14 is tightly closed, the air-tight lid 11 is opened as before, and the hopper 13 is filled with carbide. Upon closing and clamping the air-tight lid 11, the depleted carbide in the lower hopper 15 may be replaced by opening the valve 14 to permit the fresh carbide to pass from the upper hopper to the lower hopper. The supply hopper may thus be refilled while at all times excluding admission of air to or loss of gas from the generating chamber by the use of the double valve system provided by lid 11 and valve 14.

Before beginning the feed of carbide it is preferable that the reaction chambers and other gas spaces be purged of air by the introduction of acetylene from a convenient source. To feed the carbide into the generating chambers the motor M is started, which will cause the shafts 18, 27, and 27a to rotate, which in turn will cause rotation of the screw 19 and the paddles 35 and 35a. The carbide feed and hydrate discharge valves 16 and 32 are then opened, and the hydrate removal valve 34 closed. The carbide from the lower hopper will pass into the feed conduit 17 where it will be conveyed at a uniform predetermined rate by the screw 19 into the upper reaction chamber 36 and conveyed along the reaction chamber by the paddles 35. To contact the carbide with water the control valve 40 is opened to a degree sufficient to control the rate of water supply to that desired and indicated by the flow meter 43, and the valves 46 controlling the nozzles 47 are opened in succession as the carbide conveyed by the blades progresses in its path through the generating chamber. The nozzles 47 project the water onto the agitated and moving mass of carbide which will rapidly react with the water to generate the desired acetylene. As succeeding portions of the carbide are contacted with water there also will be produced successive amounts of the hydrate. The paddles agitating the carbide and hydrate mass will continually present fresh and unreacted portions of carbide to the action of succeeding water additions. Reacted and unreacted portions of the carbide pass from the upper generating chamber into the lower generating chamber where they will be further contacted with water from the nozzles in that chamber. The conveyed solids may be contacted with water throughout the whole length of their path but it has been found desirable to cease the introduction of water at a point sufficiently prior to the end of the path so that the small portions of unreacted carbide remaining in the mass may absorb and react with any water inadvertently contained in the hydrate. In this way a substantially dry hydrate is conveyed to the discharge conduit 31 from whence it will pass into the hopper 33 through the valve 32. In order to discharge the dry hydrate from the hopper 33 without interfering with the continuous operation of the process, the valve 32 may be closed, the valve 34 opened, and the hydrate then discharged through the valve 34, while hydrate produced during the discharge interval will collect in passage 31. After the desired amount of collected hydrate has been discharged the valve 34 is closed and the valve 32 opened, so that the accumulated hydrate in passage 31 will pass into the hopper 33, and the normal operation is resumed.

The continuously generated acetylene passes through headers 49 and main header 50 into a suitable gas cleaning device such as the separator 51 where small particles of hydrate which have been carried over by the acetylene settle to the lower portion of the chamber 51 from which they may be withdrawn at will through the valve 52. When the valve 53 is opened, the gass passes through conduit 54 to the cooler 56, entering the cooler through the gas inlet 55. The cooling water entering at 57 is distributed through tubes 62 by a header 63, to collect in the header 64 and pass from the cooler at the outlet 60. The passage of the water cools the tubes, and the gas entering at inlet 55 and flowing in a path substantially counter to the path of the water is cooled by contact with the outside of the tubes. A set of baffles 61 in the cooler serves to direct the gas into contact with all of the tubes. The cool gas passes through the outlet 58 and is led into the gas holder by means of the conduit 59.

As has been shown, the operation of the apparatus is continuous since the carbide supply hopper is adapted to be charged, and the hydrate hopper is adapted to be discharged, without interfering with the operation of the generator. The amount of water contacting the carbide, which is measured so as to be only slightly in excess of that necessary to completely react the carbide introduced, is regulated by the valve 40 in conjunction with the rate of flow as indicated by the flow meter. In addition, suitable temperature indicating apparatus may be provided at various points along the path of reacting carbide and the distribution of the water supplied to the several nozzles may be regulated by the valves 46 accordingly so as to achieve the most desirable working conditions.

While any suitable apparatus for effectively agitating and moving the mixture of carbide and calcium hydrate may be used in lieu of the paddles 35 and 35a, the paddles are considered advantageous since they have less tendency to interfere with the direct escape of the generated acetylene from the point of generation to the space in the top of the generating chamber. This direct flow is advantageous, especially when the generator is operated under conditions in which the local temperatures approach 400° C., the dissociation temperature of acetylene, for the gas carries off a considerable amount of the heat of reaction, and rapid removal of this heat is seen to be quite desirable.

Another arrangement of the apparatus adapted for the generation of acetylene according to the invention is shown in Figs. 3 and 4, where the upper and lower reaction chambers 36 and 37; the shafts 27', 27a, the paddles 35, 35a, bearings 38 and 39 correspond to the same parts in the apparatus of Fig. 1. The shaft 27' in this arrangement, however, is provided with an axial passage through which a cooling medium may be passed when it is desired to remove heat from the contents of the chamber 36 by conduction through the paddles 35 and the walls of the shaft 27' to the cooling medium. The means for supplying the cooling medium, preferably water, here employed comprises a housing 90 covering the ends of the shaft 27' and in which the shaft rotates. The housing is provided with a water inlet or outlet connection 91 communicating with the end of the passage in the shaft and a packing arrangement 92 to prevent escape of the water. The supply hoppers and feeding device including feed conduit 17, shaft 18, and conveying screw 19 adapted to feed the carbide into the upper reaction chamber through conduit 21, and the discharge hopper 33 with the discharge conduit 31 and valve 32 also correspond to similar parts in the apparatus of Fig. 1. In the apparatus of Fig. 3, the water is introduced into the reaction chambers on the sides, as shown more clearly in Fig. 4. The branch pipe 48 and valve 46 are provided with an extension 148 which enters the reaction chamber 36 and is affixed thereto by an air tight weld 86. This extension 148 is adapted to discharge the water onto the lower portion of the wall of the generating chamber through a wide-mouth nozzle portion 147.

In the apparatus of Fig. 3 the acetylene is preferably discharged at a plurality of points at the top of the reacting chambers by means of collecting conduits 49 similar to the conduits 49 of Fig. 2, but having individual risers 149a which join and conduct gas into a main header 150. From the header 150 the acetylene passes through a valve 153, a conduit 80, and to a separator 151 by means of inlet 81. Disposed in the separator is a filter bag 82 made of noninflammable porous material, such as woven asbestos. The acetylene is forced to pass through this filter bag and in doing so will deposit the small particles of hydrated lime carried by it upon the inner surfaces of the bag. At periodic intervals the bag is shaken by means of filter bag shaking apparatus customarily employed for such purposes but not shown in the interests of clearness of the drawings. This causes the collected hydrate to fall from the inside wall of the bag down into a collecting receptable 83 from which it may be removed at periodic intervals, or whenever necessary. After passing through the bag the acetylene passes from the separator through the outlet 84 and into conduit 85 which leads to the inlet 55 of the cooler 56. The cooler 56 is similar in all respects to the cooler shown in Fig. 1 and the acetylene enters through the inlet 55 and, after being cooled, is discharged through outlet 58 into the conduit 59 which conducts it to the gas holder or other collecting means.

The operation of the apparatus shown in Fig. 3 is substantially as follows: The carbide is fed into the reaction chamber by the screw 19; the reacted and unreacted portions of carbide are moved and agitated along a path through the reaction chambers 36 and 37, and the hydrate is discharged through the conduit 31 in a manner similar to that employed in the apparatus of Fig. 1.

The carbide, however, is contacted by the water in a manner different from that employed in the apparatus of Fig. 1. As shown in Figs. 3 and 4, the water is fed in desired increments into the side of the reaction chamber by the tangentially directed slotted nozzles 147 which project the water directly into the moving mass of carbide and hydrate instead of allowing it to fall through the gas onto the carbide. When operation is carried on at relatively high temperatures this method of contact is quite advantageous since the warm acetylene which is generated by the reaction of the previous portions of water will not pass up through the spray and vaporize and carry away a portion of the water intended for use as a reactant and coolant of the solids. In Fig. 4 the height levels which the reacting solids may assume is shown by a broken line 87 and the nozzle is shown as conducting the water into the reaction chamber on the "low" side of the carbide, that is on the side of the downward movement of the paddles 35. As succeeding portions of the carbide are reacted, the paddles in agitating and conveying the mixed solids along their path through the reaction chamber will break up small accumulations of hydrate that tend to collect near the nozzles and mix them with the reacting mass of solids so that the water is thoroughly distributed. The lighter particles of hydrate will tend to be carried to the high side of the line 87, since the lumps of unreacted carbide are heavier and tend to drop back and move along the bottom of the reaction chamber. By introducing the water at the side and directing it so that it will flow down to the bottom of the reaction chamber the heavier lumps of carbide will be contacted by the water in preference to the lighter and smaller flakes of dry hydrate.

It will be seen that the continuous and thorough agitation of the lumps of carbide causes the layers of hydrate that tend to accumulate on the surfaces of the lumps to be continuously removed as they are formed. This removal allows the water and steam to have more direct contact with the carbide so that although the reaction speed is increased, the loss of heat from the lumps of carbide is greatly increased by passage of heat to the apparatus and to the gas produced, and by loss of heat to evaporate water. The lumps of carbide are thus prevented from attaining excessive local temperatures which may cause local decomposition of the acetylene. To further reduce the amount of excess water fed into the reaction chambers, it may be desirable to cool the chambers, for example by providing cooling water jackets around the chamber 36 and by providing passages through the paddle shafts for cooling water as shown in Fig. 3.

An alternative arrangement for introducing the water is shown in Fig. 5, in which the branch pipe 48 is connected through the valve 46 to an extension 248 which enters the reaction chamber at the bottom thereof and ends internally in a longitudinally directed slotted nozzle 247. The extension 248 is affixed to the bottom of the reaction chamber by a gas-tight joint such as weld 86. With this construction the slotted nozzle 247 projects the water along the bottom of the reaction chamber in the direction of movement of the mass of reacted and unreacted carbide. The advantages of this method of introduction are the direct contact of the heavier portions of unreacted carbide which flow in the bottom of the moving mass of solids and the added propulsion which the projected water gives to the heavier portions of the moving mass.

An advantage, however, of introducing the water in the side, as in Fig. 4, over its introduction in the bottom, as in Fig. 5, consists in the diminished tendency of the nozzles 147 of Fig. 4 to become clogged when a relatively larger amount of water is used, since the paddles 35 are always sweeping material away from said nozzles in a much more positive and certain manner than that with which the paddles 35 push the mass of solids over the nozzle 247.

When saturation with water vapor of the acetylene conducted to the holder is not undesirable, a water-spray scrubbing tower may be used in lieu of the separator and cooler.

While the operation of the apparatus has been described as continuous, it is readily seen that it may be discontinuous, i. e. the generating reaction chambers may be first filled with carbide and then later contacted with the required amount of water, no more carbide being introduced until the reaction of the first portion introduced is complete, the process being repeated by successive batches.

While this invention has been described as being embodied in a specific form of acetylene generator, it will be understood that other constituents which produce a gas by the reaction of a solid and a liquid may be used in place of carbide and water, and other gases than acetylene may be produced. It will also be understood that changes may be made in the apparatus which will fall within the spirit of this invention.

The apparatus described hereinabove and shown in the accompanying drawings forms the subject-matter of our copending application Ser. No. 305,080, filed November 18, 1939.

What is claimed is:

1. A process for the continuous and simultaneous production of a gas and a substantially dry residue by the exothermic reaction of a solid and a liquid, which comprises continuously introducing said solid into a reaction chamber, contacting the solid in said reaction chamber with only sufficient liquid, in excess of the theoretical amount necessary to completely react the solid, to absorb only that portion of the heat of reaction necessary to maintain the products of reaction at a temperature substantially above the boiling point of said liquid, introducing said liquid directly into said solid to prevent its contacting the generated gas, continuously conveying the unreacted solid and the solid products of reaction along a predetermined path in said reaction chamber, and simultaneously agitating the unreacted solid and solid products of reaction so as to completely react the solid, continuously discharging the generated gas from said chamber at predetermined points in the path of said solid and solid products of reaction, and continuously discharging the substantially dry residue from said reaction chamber at the end point of said path.

2. A process for the continuous and simultaneous production of a gas and a substantially dry residue by the exothermic reaction of a solid and a liquid, which comprises the steps of introducing such solid into a reaction chamber; initially contacting the solid in said reaction chamber with a portion of such liquid so as to react a portion of such solid, the amount of liquid added being varied in response to the temperature attained by the products of the reaction; introducing said liquid directly into said solid to prevent its contacting the generated gas; conveying and agitating the unreacted solid and solid products of reaction along a predetermined path in said reaction chamber; additionally contacting such conveyed solids with other portions of such liquid at a plurality of points along said path, the portions being controlled in amount to limit the temperatures attained subsequent to said additions, the total amount of liquid added being regulated to be only sufficiently in excess of the theoretical amount necessary to completely react the solid, to absorb only that amount of the heat of reaction to maintain the temperature of the reacting products substantially above the vaporizing temperature of the liquid; continuously discharging the generated gas from said reaction chamber at predetermined points in said path; and continuously discharging the substantially dry residue from said reaction chamber.

3. A process for the continuous and simultaneous production of acetylene and substantially dry calcium hydrate by the reaction of calcium carbide and water, which comprises continuously introducing such carbide into a reaction chamber; contacting such carbide with a portion of such water so as to react a portion of such carbide; continuously conveying and agitating the unreacted carbide and the hydrate product of reaction along a predetermined path in said reaction chamber; contacting such conveyed carbide and hydrate with successive portions of water at predetermined points along its path of travel, the water being regulated in amount so as to produce a temperature of the generated acetylene substantially in excess of 100° C. at said predetermined points and introduced directly into said carbide to prevent its contacting said acetylene; continuously discharging the generated acetylene from such reaction chamber at predetermined points in said path; and continuously discharging the substantially dry hydrate from said reaction chamber at the end of said path.

4. A process for the continuous and simultaneous production of a gas and a substantially dry residue by the exothermic reaction of a solid and a liquid, which comprises continuously introducing said solid into a reaction chamber, contacting the solid in said reaction chamber with only sufficient liquid, in excess of the theoretical amount necessary to completely react the solid, to absorb only that portion of the heat of reaction necessary to maintain the products of reaction at a temperature substantially above the boiling point of said liquid, introducing said liquid directly into said solid to prevent its contacting the generated gas, continuously conveying the unreacted solid and the solid products of reaction along a predetermined path in said reaction chamber, and simultaneously agitating the unreacted solid and solid products of reaction so as to completely react the solid, continuously discharging the generated gas from said chamber, and continuously discharging the substantially dry residue from said reaction chamber at the end point of said path.

5. A process for the continuous and simultaneous production of a gas and a substantially dry residue by the exothermic reaction of a solid and a liquid which comprises continuously introducing said solid into a reaction chamber, contacting the said solid in the reaction chamber with only sufficient liquid in excess of the theoretical amount necessary to completely react the solid and to absorb only that portion of the heat of reaction necessary to maintain the products of reaction at a temperature substantially above the boiling point of said liquid, introducing said liquid directly into said solid to prevent its contacting the generated gas, continuously agitating the unreacted solid and the solid products of reaction so as to completely react the solid, removing at least a portion of the heat of reaction by contacting said products during said agitation with cooling surfaces to reduce the amount of said water directly introduced, continuously discharging the generated gas from said chamber, and continuously discharging the substantially dry residue from the reaction chamber.

HUGO V. KOJOLA.
MAURICE O'BRIAN.